United States Patent [19]

Graham

[11] Patent Number: 4,512,072
[45] Date of Patent: Apr. 23, 1985

[54] APPARATUS FOR INSTALLING POULTRY FEATHER PICKING FINGERS

[76] Inventor: Johnny R. Graham, Rte. 8, Gainesville, Ga. 30501

[21] Appl. No.: 493,054

[22] Filed: May 9, 1983

[51] Int. Cl.³ .............................................. B66F 15/00
[52] U.S. Cl. ...................................... 29/252; 279/50; 279/4; 279/1 DA; 254/18
[58] Field of Search .................... 269/3, 6; 254/18; 29/235, 252, 263; 279/50, 4, 57, 43, 37, 1 DA

[56] References Cited

U.S. PATENT DOCUMENTS 3,978,576 9/1976 Mustoe .................................. 254/18
4,059,883 11/1977 Osborne ................................. 29/263

FOREIGN PATENT DOCUMENTS 1543119 3/1979 United Kingdom .................. 254/18

Primary Examiner—Robert C. Watson
Attorney, Agent, or Firm—Thomas & Kennedy

[57] ABSTRACT

Apparatus for seating resilient fingers of a poultry feather picking machine has a housing 30 in which a sleeve 54 is reciprocally mounted that carries collet camming means 55. A collet 57 is slidably mounted in the sleeve 54 which has an annular array of resilient collet fingers 59. Pressurized fluid drive means are provided for moving the sleeve within the housing.

7 Claims, 7 Drawing Figures

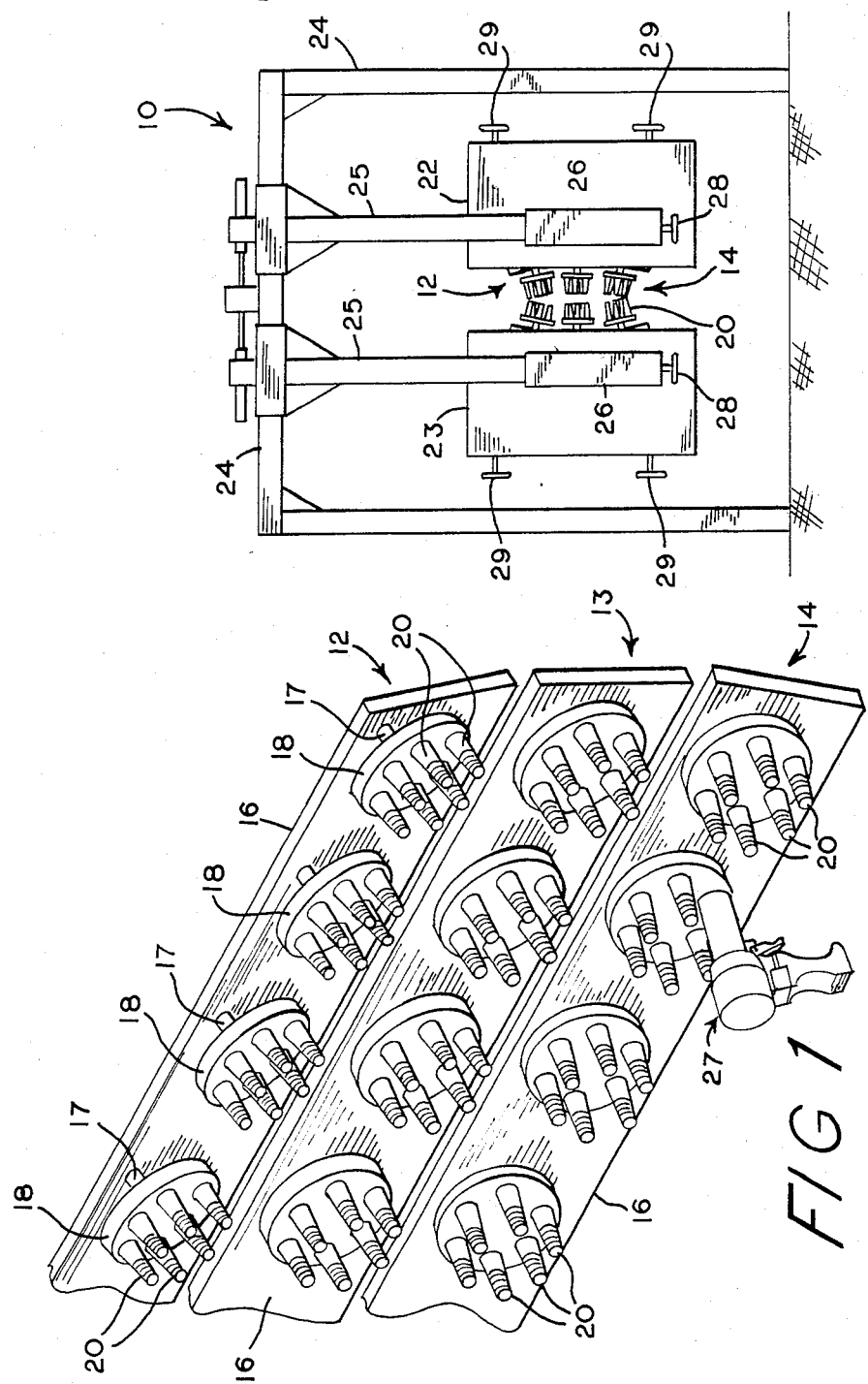

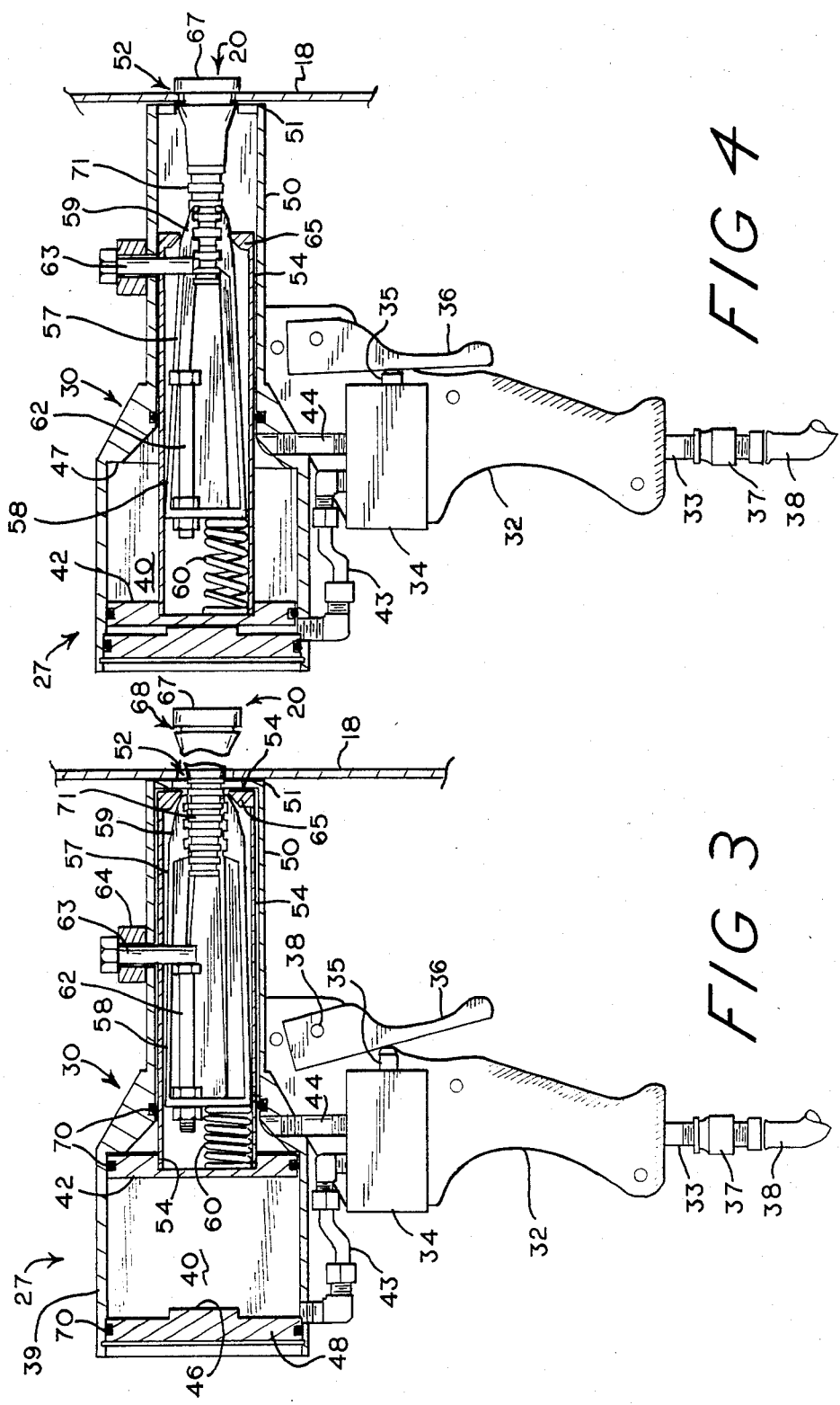

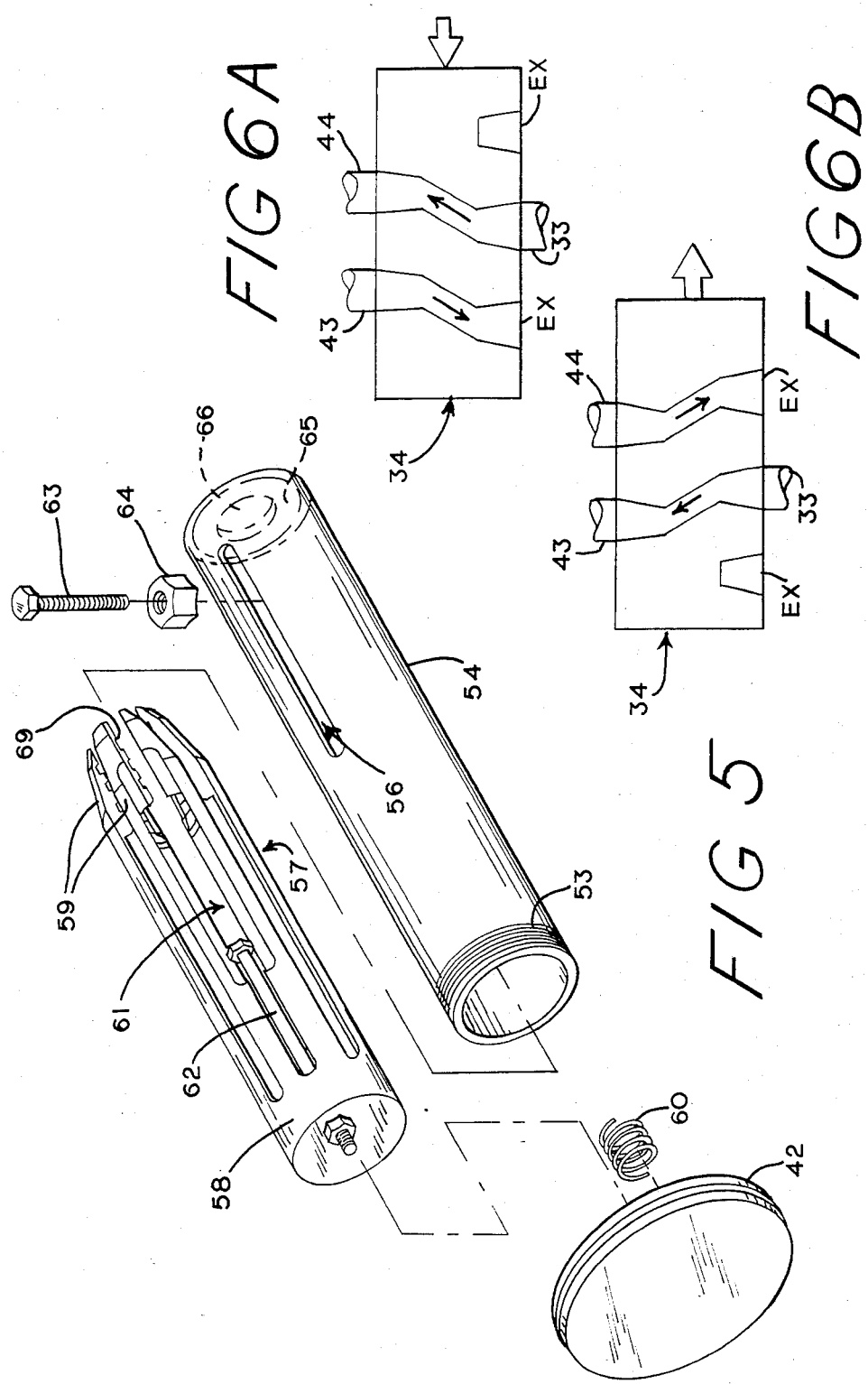

APPARATUS FOR INSTALLING POULTRY FEATHER PICKING FINGERS

TECHNICAL FIELD

This invention relates generally to equipment used in connection with poultry feather picking machines, and particularly to apparatus for installing resilient picking fingers in such machines.

BACKGROUND OF THE INVENTION

Machines have been developed for picking the feathers of poultry for use in poultry processing plants. These prior art picking machines typically have drums and/or discs to which resilient picker fingers are mounted. The drums are rotatably driven about their longitudinal axes and are positioned along each side of a path of travel along which birds are conveyed while suspended from shackles of an overhead conveyor line. In the picking machines which utilize discs, the flexible fingers extend from one surface of each disc toward the path of travel of the birds and the discs are rotated about their center axes causing each of the fingers to orbit circularly and rub against the birds, thereby defeathering them. Since the resilient fingers are constantly being driven in contact with the birds, the fingers tend to wear readily, thereby necessitating frequent replacement.

The picker fingers typically have an enlarged disc-shaped base formed with an annular recess from which base a tapered, furrowed shank extends. The annular recess of the finger base is located within a hole in the support disc or drum (hereinafter referred to as "disc") with the recess lips abutting and therefore gripping opposite sides of the rim about the hole of the support disc. To remove a worn finger from the disc the finger is severed at its recess adjacent one side of the support disc whereupon the shank falls free and its base can be pushed on through the hole in the disc and falls from the other side of the disc. A new finger then can be installed by passing its shank portion from behind the disc through the enlarged hole in the disc until its tapered surface adjacent its enlarged base engages the rim about the hole. By then pulling the shank with a substantial degree of force the base itself may then be pulled into the hole until its annular recess becomes seated in the rim of the hole.

The just described picking finger installation procedure has proven to be inefficient. It is inherently difficult to seat the picking fingers within the disc holes manually due to the amount of force required in pulling their base portion into the support holes. Not only is a substantial amount of strength required but the space available in which to work is usually quite restricted making it awkward to apply manual leverage. All of this has made finger replacement difficult, tedious, time-consuming and expensive. It is to the alleviation of this problem that the present invention is therefore primarily directed.

SUMMARY OF THE INVENTION

Briefly described, the present invention comprises apparatus for pulling and seating a resilient picking finger in a support hole of a rotary disc of a poultry feather picking machine. The finger puller apparatus includes a housing having an open end adapted to be placed against the rotary disc in alignment with one of its finger support holes, a tubular sleeve mounted for reciprocal movement within the housing and carrying collet camming means, and a collet slidably mounted within the sleeve having an annularly arranged set of resilient collet fingers positioned adjacent the collet camming means. The finger and puller apparatus also has pressurized fluid drive means for moving the sleeve within the housing. Spring means are provided for biasing the collet towards the camming surface. Stop means are mounted to the barrel for limiting movement of the collet towards the barrel end. So constructed, the housing open end can be placed against the finger support disc in alignment with a finger support hole, with the collet positioned about the shank of a poultry feather picking finger extending partially through the support hole, and upon actuation of the pressurized fluid drive means the feather picking finger is gripped and pulled by the collet and seated within the support hole.

Thus, it is an object of this invention to provide a finger puller apparatus for expediently seating resilient picking fingers in a poultry feather picking machine.

Another object of the invention is to provide a small hand held portable apparatus which is light and easily handled by its operator and which is capable of pulling resilient feather picking fingers into a seated position in a support disc or the like of a poultry defeathering machine.

Other objects, features and advantages of the invention will be understood upon reading the following description, when taken in conjunction with the accompanying drawings.

BRIEF DESCRIPTION OF THE DRAWING

FIG. 1 is a perspective view of three banks of poultry feather pickers of a picking machine shown without ancillary support and drive means and the finger puller apparatus in position to seat a finger in the picking machine;

FIG. 2 is an end elevational view of a picking machine having two confronting sets of feather picking banks of the type shown in FIG. 1;

FIG. 3 is a side elevational view, shown partly in cross-section, of the finger puller apparatus for seating fingers which apparatus embodies principles of the present invention and which is shown in a pre-actuated configuration with respect to a picking finger of the type illustrated in FIGS. 1 and 2;

FIG. 4 is another side elevational view of the finger puller apparatus illustrated in FIG. 3 shown in a post-actuated configuration;

FIG. 5 is an exploded view of some components of the apparatus shown in FIGS. 3 and 4; and FIGS. 6A and 6B are schematic illustrations of a pneumatic switch component of the apparatus which switch is shown in two different operative positions.

DETAILED DESCRIPTION

Referring now in more detail to the drawing, there is shown in FIGS. 1 and 2 a poultry feather picking machine 10 having two sets of three picking banks each that straddle a path of travel for poultry suspended from an unshown overhead conveyor line. To the right-hand side of the path of travel, as viewed in FIG. 2, is located an upper bank 12, a middle bank 13 and a lower bank 14 with the upper and lower banks being tilted slightly towards the middle bank. Each bank is seen to comprise a support plate 16 through which a set of drive shafts 17 is rotatably journaled. A disc 18 is mounted to the end of each shaft while a set of resilient, annularly arranged or arrayed picking fingers 20 is seen to project from the face of each disc and extending away from the support plate 16.

The picking machine 10 is further seen to include two housings 22 and 23 in which unshown power drive systems are housed for rotatably driving the drive shafts 17 and the discs 18. The housings are suspended from a frame 24 by stanchions 25 which extend through collars 26 that are secured to the housings. The banks may be raised and lowered upon the stanchions by rotation of handles 28 while they may be moved laterally to adjust the gap between confronting picking banks by rotation of handles 29. The construction and operation of the feather picking machine of FIGS. 1 and 2 do not comprise a part of this invention.

FIGS. 3-6 illustrate the finger puller apparatus 27 for seating resilient fingers 20 within disc holes or channels 52 of the discs 18. In FIG. 3 the finger puller 27 has its component parts positioned for actuation and seating of a finger, and in FIG. 4 the finger puller has its components shown in their position following actuation and finger seating. The finger puller apparatus has a generally tubular housing 30 from which a handle 32 depends. A conduit 33 extends through the handle to a pneumatic switch 34 which is actuatable by a trigger 36 positioned to depress a switch button 35. The lower end of the conduit 33 is connected by a coupling 37 with a compressed air supply line 38. The button 35 of the switch is normally spring biased outwardly to the position shown in FIG. 3 while the trigger 36, which is pivotably mounted by a pivot pin 38 to the housing, is spring biased into contact with the button.

Within the housing 30 is located an air cylinder 39 that includes a cylinder chamber 40 in which a piston 42 is slidably positioned. A conduit 43 provides fluid communication between the pneumatic switch 34 and the left side of the cylinder chamber 40 located to the left of the piston 42 as viewed in FIGS. 3 and 4. Another conduit 44 provides fluid communication between the pneumatic switch and the right side of the chamber to the right of the piston. In this manner it is seen that the piston can be driven from its right position as shown in FIG. 3 to its left position as shown in FIG. 4 upon actuation of trigger 36 which connects conduit 44 with conduit 33 and thus to the source of compressed air as shown in FIG. 6A. At the same time that portion of chamber 40 to the left of piston 42 is vented by the switch connecting conduit 43 with a switch exhaust vent. Upon release of trigger 36 the conduit 43 is placed in communication with the source of compressed air as shown in FIG. 6B and that portion of chamber 40 to the right of the piston is vented, thereby returning the piston to its position as shown in FIG. 3. The two extreme positions of the piston are limited by a stop 46 of closure disc 48 and a chamber ledge 47.

From the chamber 40 the housing necks down to a barrel portion 50 that extends to a flat end 51 which may be abutted against the flat face of one of the discs 18 of the picking machine shown in FIG. 2 about a disc hole 52. Alternatively, the end 51 may be abutted against a curved surface of a drum type finger support (not shown) in picking machines of that type. Within the barrel 50 is slidably positioned a tubular sleeve 54 (FIG. 5) having a slot 56. The sleeve 54 is rigidly mounted at one end to the piston 42 by its external threads 53 engaging threads of the counter bore 55 of the piston 42. The other end of the sleeve remote from the piston is partially closed with an inwardly directed flange that has a conically shaped, interior camming surface 65 that extends about an opening 66 located along the axis of the tubular sleeve.

A spring steel collet 57 is slidably mounted within the sleeve 54. The collet has a cup-shaped base portion 58 from which a set of resilient fingers 59 unitarily extend in an equally spaced cylindrical array that terminate with inwardly facing ridged, gripping end portions 69. The outer surfaces of the resilient fingers 59 are tapered. In FIGS. 3 and 4 the fingers are six in number while in FIG. 5 they are eight in number to illustrate that the collet may have various numbers of fingers.

The collet 57 is formed of tool hardened steel which renders it resilient with a high degree of spring back to its normal position of self orientation as shown in FIGS. 3 and 5.

The collet 57 is biased to the right (FIGS. 3 and 4) against the camming surface 65 by a compression spring 60. Movement of the collet to the right within the sleeve 54 is however limited by a bolt 62 mounted to the collet base and extending parallel to the length of the collet and by another bolt 63 which is threaded through a nut 64 welded to the exterior surface of barrel 50 and which extends radially with respect to the collet. The bolt 63 extends through slot 56 formed in the upper portion of the sleeve 54, as best viewed in FIG. 5, and through an enlarged spacing between adjacent ones of the collet fingers shown at 61. Finally, three O-rings 70 are provided for preventing air leaks from the cylinder chamber to ambience or into the barrel or past the piston periphery.

When, through wear and tear, a resilient picking finger 20 needs to be replaced in a feather picking machine of the type illustrated in FIGS. 1 and 2 the old finger is severed into two parts which are pulled free from opposite sides of a disc 18. The furrowed shank 66 of a new finger is then inserted from the rear of the disc adjacent the support 16 through the disc hole 52 bringing the finger base 67 and annular recess 68 to a position close to the rear face of the disc 18. The finger puller apparatus 27 is then placed in the position shown in FIGS. 1 and 3, with the barrel end 51 flush against the disc 18 and with the furrowed 71 shank of the picking finger extending through the barrel end 51, and into sleeve 54, and between the gripping end portions 69 of the set of annularly arranged collet fingers 59. The picking finger then can be seated within the disc hole as shown in FIG. 4 by actuation of the trigger 36.

Actuation of the trigger causes compressed air to flow into the cylinder chamber 40 to the right of piston 42 thereby driving the piston to the left into abutment with stop 46 as shown in FIG. 4. As the piston is being driven to the left the sleeve 54 moves in unison with the piston and axially extending bolt 62 tends to move to the left away from radially extending bolt 63; however, compression spring 60 urges the collet 57 to the right within and relative to the sleeve 54. As this is done the collet fingers move partially through opening 66 if sleeve 54 and their tapered outer surfaces are engaged by the camming surface 54. As the gripping end portions 69 of the collet fingers pass through the opening in the sleeve the camming surface 55 drives the collet fingers towards one another and into gripping engagement with the furrowed shank 71 of the picking finger 20. Simultaneously with this closing action of the collet fingers into gripping engagement with the picking finger shank both the sleeve and collet are drawn to the left by the movement of the piston 42 to the left, thereby pulling the picking finger further into the disc hole 52 until the finger recess becomes fully seated as shown in FIG. 4 and the piston contacts stop 46. Following this the trigger 36 is released whereupon compressed air is fed through the pneumatic switch 34 into the cylinder chamber 40 to the left of the piston thereby urging it back to the right to its position as shown. The resilient collet fingers then spread apart and release their grip upon the picking finger shank. The apparatus can be recycled to pull the finger further through the disc, if necessary, or the apparatus can be removed from the disc and picking finger.

It thus is seen that apparatus has now been provided for seating picking fingers within support holes of a poultry feather picking machine. It should however be understood that the just described enbodiment merely illustrates principles of the invention in one preferred from. Many modifications, additions and deletions may, of course, be made thereto without departure from the spirit and scope of the invention as set forth in the following claims.

I claim:

1. Apparatus for seating a resilient picking finger in a support hole of a poultry feather picking machine comprising, in combination, a housing having an open end adapted to be placed against the support about the hole; a tubular sleeve mounted for reciprocal movement within said housing and carrying collet camming means; a collet slidably mounted within said sleeve having an annularly arranged set of resilient collet fingers positioned adjacent said collet camming means; pressurized fluid drive means for moving said sleeve within said housing, spring means for biasing said collet toward said collet camming means, and stop means mounted to said housing for limiting movement of said collet toward said housing open end whereby the housing open end can be placed against the machine support about the support hole with the collet positioned about the shank of a poultry picking finger extending through the support hole and upon activation of the pressurized fluid drive means the picking finger gripped and pulled by the collet and seated within the support hole.

2. Finger seating apparatus in accordance with claim 1 wherein said camming means comprises a centrally apertured sleeve end wall having conical surface.

3. Finger seating apparatus in accordance with claim 1 wherein said pressurized fluid drive means comprises a piston slidably mounted within said housing to which said sleeve is secured, and conduit means for introducing and exhausting pressurized fluid into and from said housing to each side of said piston.

4. Apparatus for seating a resilient finger in a support hole of a poultry feather picking machine comprising an air cylinder having a piston slidably mounted within a chamber; a barrel extending from said air cylinder chamber to a barrel end located distal said chamber adapted to be placed against the support about the support hole; a tubular sleeve mounted to said piston and extending into said barrel and having a camming surface located within a sleeve end distal said piston; a collet slidably mounted within said sleeve having an annular array of resilient collet fingers positioned adjacent said camming surface; spring means for biasing said collet towards said camming surface; and stop means mounted to said barrel for limiting movement of said collet towards said barrel end.

5. Finger seating apparatus in accordance with claim 4 having means for sealing said barrel from said air cylinder chamber.

6. Finger seating apparatus in accordance with claim 4 wherein said stop means includes a first stop member mounted to and positioned within said collet and a second stop member mounted to said barrel and extending through said sleeve and into said collet.

7. Finger seating apparatus for pulling flexible feather picking fingers of a poultry defeathering machine into a seated position of a disc support or the like comprising a cylindrical barrel having an axial opening at one end, a sleeve reciprocatably mounted in said barrel defining an opening at one end positioned adjacent the opening of said barrel, a plurality of gripping fingers positioned in an annular array within said sleeve, spring means for urging said gripping fingers longitudinally with respect to said sleeve partially through the opening of the sleeve whereby the opening gathers the fingers, stop means for limiting the movement of said fingers toward the axial opening of said barrel, and means for moving said sleeve longitudinally away from the axial opening of said barrel, whereby a feather picking finger protruding into the axial opening of said barrel will be gripped and pulled by the fingers partially into the barrel as the sleeve moves away from the opening of the barrel and the opening of the sleeve gathers the griping fingers into engagement with the picking finger.

* * * * *